United States Patent Office 3,756,977
Patented Sept. 4, 1973

3,756,977
PROCESS FOR PRODUCING HYDROGENATED HYDROCARBON POLYMERS, OIL-EXTENDED RUBBER COMPOSITIONS AND PROCESS FOR PRODUCING THEM
Toshio Yoshimoto, Makoto Fujimori, Seiya Kaneko, Yukihisa Takeda, and Haruo Koyama, Tokyo, Japan, assignors to Bridgestone Tire Company Limited, Tokyo, Japan
No Drawing. Continuation of application Ser. No. 745,139, July 16, 1968, which is a continuation-in-part of application Ser. No. 563,961, July 11, 1966, both now abandoned. This application Aug. 18, 1970, Ser. No. 64,829
Claims priority, application Japan, July 19, 1965, 40/43,170
Int. Cl. C08c 11/22, 11/36; C08d 5/00
U.S. Cl. 260—33.6 AQ         1 Claim

ABSTRACT OF THE DISCLOSURE

Novel hydrocarbon polymer having hydrogen saturated olefinic bonds is produced by hydrogenating the polymer having olefinically unsaturated bonds with hydrogen in the presence of a catalyst obtained by reacting chromium carboxylate with an organoaluminum compound. Such novel hydrocarbon polymer can provide an oil-extended rubber composition by mixing with a large amount of process oil.

---

The present invention relates to novel hydrocarbon polymers, a process for producing hydrogenated hydrocarbon polymers from hydrocarbon polymers of which olefinically unsaturated bonds are selectively hydrogenated in the presence of a soluble catalyst, a new class of an oil-extended rubber composition, especially a new oil-extended rubber composition comprising a large amount of process oil and a process for producing said oil-extended rubber composition.

This application is a continuation of application Ser. No. 745,139 filed July 16, 1968 and now abandoned which in turn is a continuation-in-part of application Ser. No. 563,961, filed July 11, 1966 and now abandoned.

In order to hydrogenate olefinically unsaturated polymers efficiently by the use of an ordinary heterogeneous reduced metal catalyst such as Raney nickel and nickel kieselguhr, it was necessary to use a large amount of catalysts, a high reaction temperature of from 150° C. to 200° C. or higher and a high hydrogen pressure, because a solution of hydrocarbon polymers containing olefinically unsaturated bonds is highly viscous compared with that of low molecular weight olefins.

Further, these heterogeneous catalysts are disadvantageous for hydrogenation of polymers, because they are easily poisoned by impurities which are difficult to be removed from a raw polymer and also it is very difficult to remove such a heterogeneous catalyst residue from hydrogenated polymers after hydrogenation.

It is an object of this invention, therefore, to provide a new stable catalyst with high activity suitable for the hydrogenation of polymers in a viscous solution form. Another object of the invention is to provide a new process suitable for hydrogenating polymers in a viscous solution form. A further object of the invention is to provide new hydrogenated polymers suitable for manufacturing the rubber articles.

Furthermore, it is an object of the present invention to provide a new oil-extended rubber composition the tensile strength of which is high even when a large amount of oil is mixed therein. Another object of the present invention is to provide a new oil-extended rubber composition suitable for manufacturing rubber articles. A further object of the present invention is to provide a new advantageous process for producing an oil-extended rubber industrially. Other and further objects of the present invention will become apparent to those skilled in the art upon consideration of the accompanying disclosure.

We have now found that a minor amount of soluble catalyst prepared by mixing a metal carboxylate and an organoaluminum compound can carry out selective hydrogenation of olefinically unsaturated bonds of polymers partially or completely under a mild condition near room temperature and an atmospheric pressure of hydrogen, and also the soluble catalyst of the invention is stable to impurities and easily removed from the hydrogenated polymers.

We have also found that these catalysts can give novel hydrocarbon high copolymers which have extremely higher green strength, heat resistance, resilience and oil extending property compared with ordinary synthetic rubber.

The present invention provides a process for producing hydrocarbon high copolymers having hydrogen-saturated olefinic bonds, which comprises reacting selectively olefinically unsaturated bonds of the hydrocarbon polymer in a solution form with hydrogen of less than 50 atm. at a temperature of from 0° C. to 120° C. in the presence of a catalyst soluble in said solution, the catalyst being obtained by reacting at least one metal carboxylate having the formula $(RCOO)_nM$ with at least one organoaluminum compound having the formula $AlR_2''R'$, at a temperature of from $-78°$ C. to $100°$ C., preferably from $-78°$ C. to $60°$ C., in the mole ratio of M to Al lying within the range of from 1:0.2 to 1:8.

The metal carboxylate having the formula $(RCOO)_nM$, in which M is a metal selected from the group consisting of nickel, cobalt, iron, chromium and manganese, R is a hydrocarbon radical having from 1 to 50 carbon atoms, preferably from 5 to 30 carbon atoms and $n$ is the valence number of M.

These metal carboxylates include nickel, cobalt, iron, chromium and manganese salts of hydrocarbon aliphatic acid, hydrocarbon aromatic acid and hydrocarbon cycloaliphatic acid. Examples of such hydrocarbon aliphatic acid include a hexanoic acid, a heptanoic acid, an octanoic acid, a nonanoic acid, a decanoic acid, a dodecanoic acid, myristic acid, palmitic acid, stearic acid, a dodecenoic acid, oleic acid, linoleic acid and rhodinic acid, etc. Examples of such hydrocarbon aromatic acid include benzoic acid, alkyl-substituted aromatic acid in which alkyl has from 1 to 20 carbon atoms, such as t-butyl-, 2-ethylhexyl-, dodecyl- and nonyl-benzoic acids, etc., and examples of such cycloaliphatic acid include naphthenic acid and abietic type resin acid, etc.

A great number of metal carboxylates having different acid radicals as described above can be used in almost similar effectiveness as the catalytic component of the invention, when the kind of metal is same and the amount of the metal used is same. However, a metal carboxylate having a hydrocarbon radical of from 1 to 4 carbon atoms reacts with an organoaluminum compound to form a reaction mixture, a major part of which is an insoluble deposit. This insoluble deposit acts as non-selective hydrogenation catalyst and has inferior activity at the low temperature as in the invention. A minor part of this reaction mixture which is soluble has nearly the same selectivity for hydrogenation as that of the invention. Thus the efficiency for selective hydrogenation of these heterogeneous catalysts described above is inferior to that of the catalyst according to the invention, when compared in the same amount of the metal used.

Commercially available metallic soaps such as naphthenic acid salts, rosin acid salts, linoleic acid salts, oleic acid salts, stearic acid salts and tall oil salts may be used.

Among the metal carboxylates as described above, nickel and cobalt carboxylates may be preferably used for higher degree of hydrogenation, but iron, chromium and manganese carboxylates may be rather used for lower degree of hydrogenation.

The organoaluminum compound, which is other component of the catalyst of the invention, has the formula $AlR_2''R'$, in which $R''$ is a hydrocarbon radical having from 1 to 12 carbon atoms and $R'$ is hydrogen, an alkoxy radical or a hydrocarbon radical having from 1 to 12 carbon atoms. As the organoaluminum, use may be made of trialkylaluminum of which the alkyl has from 1 to 12 carbon atoms.

The hydrocarbon radical or $R''$ and $R'$ includes an alkyl, aryl, alkaryl, aralkyl or cycloaliphatic group. Examples of such groups include methyl, ethyl, n-propyl, i-propyl, n-butyl, i-butyl, sec-butyl, tert-butyl, pentyl, hexyl, heptyl, octyl, nonyl, decyl, dodecyl, phenyl, benzyl, tolyl, cyclopentyl, cyclohexyl, cyclohexenyl and naphthyl radicals.

The group combined to oxygen in the alkoxy radical of the invention is exemplified as described above too. Examples of such organoaluminum compounds include triethylaluminum, tri-n-propylaluminum, triisopropylaluminum, tri-n-butylaluminum, triisobutylaluminum, triamylaluminum, trihexylaluminum, trioctylaluminum, tridodecylaluminum, diethylisobutylaluminum, diethyloctylaluminum, didodecylaluminum hydride, tricyclohexylaluminum, diisobutylaluminum hydride, diethylaluminum ethoxide, dibutylaluminum butoxide, isophenylaluminum, etc., and mixtures of any of these organoaluminum compounds.

The catalyst of the invention may be obtained by reacting the metal carboxylate having said $(RCOO)_nM$ with the organoaluminum compound having said $AlR_2''R'$ in which the mole ratio of M to Al is within the range of from 1:0.2 to 1:10 but preferably within the range of from 1:0.2 to 1:8. When the mole ratio of Al to Cr exceeds 8 or does not reach 0.2, it is observed that the activity as the hydrogenation catalyst decreases in the case of chromium naphthenate and triethylaluminum.

It is well known that when compounds of metals such as nickel, cobalt, iron and manganese are reacted with an organoaluminum compound, they are reduced to a metallic state and the reaction products are not always soluble in a hydrocarbon solvent. It has been found that when the metal carboxylate of the $(RCOO)_nM$ is reacted with the organoaluminum compound of the $AlR_2''R'$ in a limited reaction medium of lower temperature, initial color of the metal salt turns to brown or black and a new reaction complex is obtained and this complex is always soluble in a solution of the hydrocarbon polymers to be hydrogenated. We have now found that this soluble complex is a catalyst which has excellent activity and selectivity for hydrogenation of olefinically unsaturated bonds of hydrocarbon polymers.

According to the invention this catalyst is prepared by reacting both the catalytic components at a temperature of from —78° C. to 100° C. in a solution of hydrocarbon polymers to be hydrogenated or in a solvent to be used for dissolving said polymers.

When the catalyst is prepared outside of the solution of the hydrocarbon polymers to be hydrogenated, both the catalytic components are reacted preferably at a temperature of from —78° C. to 50° C., more preferably from —78° C. to 35° C. and most preferably from —78° C. to 25° C. according to the invention. As increasing the temperature of the outside catalyst preparation, the efficiency of the catalyst of this invention decreases.

When the catalyst is prepared inside of the solution of the hydrocarbon polymers to be hydrogenated, both the catalytic components are reacted preferably at a temperature of from 0° C. to 100° C., more preferably from 20° C. to 80° C. and most preferably from 20° C. to 60° C. according to the invention. When both the catalytic components are reacted at a temperature below 0° C., long period of time is required for the formation of the catalyst.

It has been found that the catalyst prepared by the later method maintains a higher efficiency of hydrogenation for a long time. Selectivity for hydrogenation of olefinically unsaturated bonds decreases as increasing the temperature higher than 120° C.

After nickel naphthenate or cobalt octanoate was reacted with triethylaluminum in various mole ratios of Al to the metal at 30° C. in toluene, the average valency of the metal in the catalyst was analyzed by H. N. Friedlander method (Ind. Eng. Chem., 49, 1885 (1957)). Results are shown in Table 1.

TABLE 1

| $Al(Et)_3/M^{+2}$ (mole ratio) | 1.0 | 3.0 | 5.0 | 7.0 | 9.0 | 15.0 | 20.0 |
|---|---|---|---|---|---|---|---|
| Average valency of— | | | | | | | |
| Nickel | 1.7 | 1.6 | 1.2 | 0.1 | 0.1 | 0.06 | 0 |
| Cobalt | 1.9 | 1.7 | 1.4 | 0.9 | 0.2 | 0.19 | 0 |

Table 1 shows that the metals of the carboxylates included in the catalysts are reduced but not reduced to zero valence or metallic state in the mole ratio of Al to the metal and at the temperature as used in the invention.

The similar results were observed when the catalyst according to the invention was prepared in the solution of the polymer to be hydrogenated in toluene.

Further, when the solution of the polymer to be hydrogenated containing the catalyst obtained by the procedure of the invention was ultracentrifuged, the catalyst of the invention was not separated.

These facts show that the high activity and selectivity for hydrogenation of the catalyst of the invention are neither due to a metallic deposit nor a zero valence metal, but due to the reaction complex soluble in the solution of the polymer to be hydrogenated. Efficient hydrogenation can be carried out at a temperature of from 0° C. to 120° C., preferably from 0° C. to 100° C., and most preferably from 20° C. to 60 C., in the presence of the present catalyst.

Hydrogen may be used at a high pressure, but as the pressure increases, the activity for hydrogenation increases while the selectivity for hydrogenation decreases, so that according to the invention the hydrogenation is carried out at a pressure of less than 50 atm., preferably less than 10 atm.

The catalyst of the invention has so high activity of selective hydrogenation of olefinically unsaturated bonds that hydrogenation can be carried out under atmospheric pressure of hydrogen and at room temperature and if necessary, hydrogen is diluted with nitrogen. According to the invention the concentration of the catalyst may be applicable at 0.1 mmol/lit. or more of the metal of the carboxylate in the reaction medium for hydrogenation.

The catalytic hydrogenation of the polymer having olefinically unsaturated bonds proceeds non-destructively by the use of the catalyst according to the invention. This was ascertained by the fact that number average molecular weight of the hydrocarbon polymer was nearly same before and after the hydrogenation.

This is one of the merits of the present invention.

According to the invention, saturated hydrocarbon, aromatic hydrocarbon, hydroaromatic hydrocarbon, chlorinated aromatic hydrocarbon and ether may be used as solvents. Examples of such solvents include hexane, heptane, octane, cyclohexane, methylcyclohexane, Decalin, Tetralin, benzene, toluene, xylene, chlorobenzene, butylether, anisole, dioxane and their mixture. Among them saturated hydrocarbon may be used preferably.

According to the invention, the concentration of hydrocarbon polymers to be hydrogenated may be from 1 to 30%, preferably from 1 to 20%. As shown in an example it shows an excellent hydrogenation efficiency of the catalysts obtained according to the invention that hydrogenation of high viscous solution containing 10% of hydrocarbon polymers can be effectively carried out at room temperature and under atmospheric pressure of hydrogen, and this is one of merits of the present invention.

After the hydrogenation, removal of solvent and catalysts from the hydrogenated hydrocarbon polymers is easily carried out by adding polar solvent such as acetone and alcohol to the reaction mixtures and precipitating the polymers, or by pouring the reaction products into a hot water and removing solvent by azeotropic distillation. In these procedures, catalysts are decomposed and the major part of them is removed from the polymers, but the most effective removal of the catalysts is attained by contacting the reaction mixtures with polar solvent containing a small amount of acid.

The process of the invention may be applied to hydrogenation of hydrocarbon polymers containing olefinically and non-acetylenically unsaturated bonds such as polybutadiene, polyisoprene, natural rubber, polydimethylbutadiene, butadiene-styrene copolymer (random or block type), butadiene-isoprene copolymer (random or block type), butadiene-α-methystyrene copolymer, polybutadiene grafted with a minor amount of styrene and other hydrocarbon polymers containing olefinically unsaturated bonds. These polymers may be prepared by bulk polymerization, solution polymerization or emulsion polymerization by the use of radical type initiator, ionic type initiator or Ziegler type initiator.

The process of the invention provides new hydrocarbon high copolymers. The present invention provides hydrocarbon high copolymers consisting of diolefinic unit, hydrogen-saturated diolefinic unit and alkenyl aromatic unit, the alkenyl aromatic unit being randomly distributed in said hydrocarbon high copolymers, and said hydrocarbon high copolymers having the percent unsaturation of less than 60.

The diolefinic unit includes at least one butadienic, isoprenic, hexadienic, heptadienic, octadienic, hydrocarbon-substituted butadienic, cyclohexadienic, and cyclooctadienic unit, etc.

The alkenyl aromatic unit includes at least one styrenic, hydrocarbon-substituted styrenic, phenylpropylenic, phenylbutylenic, α-methylstyrenic and β-methylstyrenic unit, etc.

We have now found that these copolymers have many excellent properties, for example, higher green strength, resilience, oil extendability and heat resistance than those of the corresponding polymer consisting of diolefinic unit and alkenyl aromatic unit of which content is the same as said hydrocarbon high copolymer. These copolymers also have property of roll processability, extrusion, or high filler-loading.

The present invention preferably provides hydrocarbon high copolymers consisting of butadienic unit, hydrogen-saturated butadienic unit and styrenic unit, the styrenic unit being randomly distributed in said hydrocarbon high copolymers and said hydrocarbon high copolymers having a percent unsaturation of less than 60, preferably less than 50, more preferably less than 40 and most preferably less than 30. The advantages of these copolymers is illustrated in later examples.

The butadienic unit is expressed by

—CH$_2$—CH=CH—CH$_2$— and/or —CH—CH$_2$—
$\qquad\qquad\qquad\qquad\qquad\qquad$ |
$\qquad\qquad\qquad\qquad\qquad\qquad$ CH
$\qquad\qquad\qquad\qquad\qquad\qquad$ ||
$\qquad\qquad\qquad\qquad\qquad\qquad$ CH$_2$ the hydrogen-saturated butadienic unit is expressed by —CH$_2$—CH$_2$—CH$_2$—CH$_2$— and/or —CH—CH$_2$—
$\qquad\qquad\qquad\qquad\qquad\qquad\qquad$ |
$\qquad\qquad\qquad\qquad\qquad\qquad\qquad$ CH$_2$
$\qquad\qquad\qquad\qquad\qquad\qquad\qquad$ |
$\qquad\qquad\qquad\qquad\qquad\qquad\qquad$ CH$_3$ and the styrenic unit is expressed by

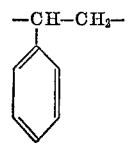

In the case of a lower styrene content, the present invention provides hydrocarbon high copolymers consisting of butadienic unit, hydrogen-saturated butadienic unit and styrenic unit of which content lying in the range of from 1 to 24 percentage of total units, the styrenic unit being randomly distributed in said hydrocarbon high copolymers and preferably said hydrocarbon high copolymers having a percent unsaturaiton of less than 90. These copolymers have improved green strength and other properties.

In the case of a higher styrene content, the present invention provides hydrocarbon high copolymers consisting of butadienic unit, hydrogen-saturated butadienic unit and styrenic unit of which content lying in the range of from 30 to 60 percentage of total units, the styrenic unit being randomly distributed in said hydrocarbon high copolymers and preferably said hydrocarbon high copolymers having the percent unsaturation of less than 65. These copolymers have improved heat resistance and other properties.

The present invention also provides hydrocarbon high copolymers consisting of at least one kind of diolefinic unit and at least one kind of hydrogen-saturated diolefinic unit of which content is less than 90 percentage of the total units, the diolefinic unit being at least 85 percentage of 1,4-addition type.

The diolefinic unit includes those described above. We have now found that these copolymers have improved green strength, less cold flow property, high tensile strength after vulcanized, and the others.

The present invention preferably provides hydrocarbon high coplymers consisting of a major part of units which consists of butadienic units of at least 85% of 1,4-addition type and the hydrogen-saturated butadienic units and a minor part of units which consists of isoprenic units and the hydrogen-saturated isoprenic units, preferably the isoprenic unit being randomly distributed in said hydrocarbon high copolymer.

The isoprenic unit is expressed by

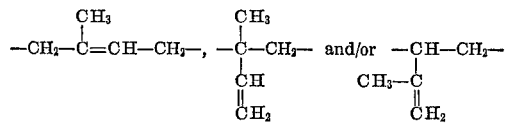

The hydrogen-saturated isoprenic units are expressed by

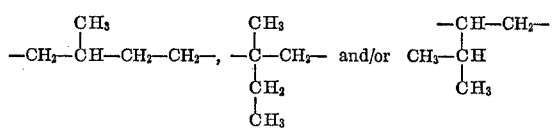

The present invention preferably provides hydrocarbon high copolymers consisting of butadienic unit and hydrogen-saturated butadienic unit, the butadienic unit being at least 85 percent of 1,4-addition type and having the degree of hydrogen saturation of less than 20 percent, preferably less than 12% and most preferably less than 9%.

The 1,4-addition types of the butadienic units in the resulting hydrocarbon high copolymers above described are preferable to be cis-1,4 configuration.

These copolymers described above all may be most easily obtained by the process of the invention.

The copolymers of the invention are easily curable by the conventional procedure and may be applied to production of rubber article.

Furthermore, we have found that the hydrogenated hydrocarbon polymers obtained by the above described manner can give an oil-extended rubber composition with a large tensile strength, even by mixing with a large amount of process oil. With respect to this inventive aspect, a more detailed explanation will be made hereinafter.

It is well known that processibilities of widely used synthetic rubbers such as styrene-butadiene copolymer, polybutadiene and polyisoprene can be improved by mixing the rubbers with process oil such as mineral oil. It is also well known that the cost of synthetic rubber stocks can be decreased potentially by mixing the rubbers with a large amount of process oil as extender or diluent. When 100 parts by weight of synthetic rubber having a Mooney viscosity at 100° C. (ML-4) of from 40 to 50, which can be used usually without being oil-extended, are extended with 37.5 parts by weight of process oil, the obtained oil-extended rubber has the tendency of cold flow during storage and moreover has the inferior physical properties after vulcanized. Therefore, oil-extended rubbers used commonly have been prepared usually by mixing process oil with synthetic rubbers of which molecular weight is high enough to cover the inferiority of their physical properties in vulcanized state or unvulcanized state. However, it is well known that the tensile strength in unvulcanized state or vulcanized state of such high molecular weight rubbers still decreases to the insufficient level as the content of oil becomes higher. This undesired tendency of the tensile strength of a usual oil-extended rubber is an obstacle in manufacturing rubber articles, especially in the process of forming a green case of a tire.

Further, when the synthetic rubber of high molecular weight is produced in industrial process, many kinds of difficulties arise. When very high molecular weight polymers are prepared in emulsion-polymerization, gel formation occurs in the final stage of polymerization and therefore the degree of conversion must be diminished. In order to produce high molecular weight polymers by solution-polymerization, the content of active catalyst must be reduced and therefore impurities in the polymerization system must be removed completely. Also, in the solution-polymerization which has been widely effected in recent years, the viscosity of the polymer solution increases remarkably as the polymerization reaction proceeds and it becomes very difficult, especially in an industrial process, to stir the polymer solution and also very difficult to remove heat of polymerization because the heat conductivity of the viscous polymer solution is very small.

The second aspect of the present invention provides an oil-extended rubber composition comprising process oil and hydrocarbon high copolymers consisting of diolefinic units, hydrogen-saturated diolefinic units and alkenyl aromatic units, the alkenyl aromatic units being randomly distributed in said hydrocarbon high copolymers, and said hydrocarbon high copolymers having the percent unsaturation of less than 60.

The diolefinic unit includes at least one butadienic, isoprenic, hexadienic, heptadienic, octadienic, hydrocarbon-substituted butadienic, cyclohexadienic and cyclooctadienic unit, etc.

The alkenyl aromatic unit includes at least one styrenic, hydrocarbon - substituted styrenic, phenylpropylenic, phenylbutylenic, α-methylstyrenic and β-methylstyrenic unit, etc.

The oil-extended rubber composition of the present invention is preferably obtained from hydrocarbon high copolymers consisting of butadienic unit, hydrogen-saturated butadienic unit and styrenic unit being randomly distributed in said hydrocarbon high copolymers and said hydrocarbon high copolymers having a percent unsaturation of less than 60, preferably less than 50, more preferably less than 40 and most preferably less than 30.

The butadienic unit is expressed by

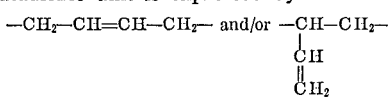

the hydrogen-saturated butadienic unit is expressed by

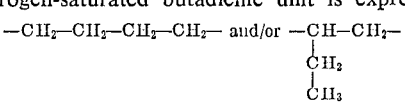

and the styrenic unit is expressed by

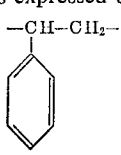

The hydrocarbon high copolymers consisting of butadienic units, hydrogen-saturated butadienic units and styrenic units can be easily prepared by the hydrogenation of a styrene-butadiene random copolymer. According to the present invention, an oil-extended rubber having excellent properties can be obtained by utilizing a random copolymer having a Mooney viscosity of from 40 to 50 from which an oil-extended rubber having inferior properties is obtained by the prior art. For example, after hydrogenating 90 percent of butadiene units of a styrene-butadiene random copolymer (styrene/butadiene:23/77, ML-4 at 100° C.:52), such a large amount as 100 phr. (phr. is the abbreviation of parts by weight per hundred parts by weight of rubber) of aromatic oil may be mixed with the resulting hydrogenated copolymer. The tensile strength in the unvulcanized state of that obtained oil-extended rubber is surprisingly ten times higher than that of the original non-hydrogenated styrene-butadiene random copolymer without process oil. Further, the viscosity of a polymer solution to be hydrogenated increases little in the procedure of the present invention and the present invention is therefore more advantageous in view of an industrial apparatus than the prior art.

According to the present invention, an oil-extended rubber having excellent properties can be obtained from a random copolymer of diolefin and alkenyl aromatic hydrocarbon, preferably a random copolymer of diolefin containing less than 30 percent by weight of alkenyl aromatic hydrocarbon. Although an oil-extended rubber may be obtained from a random copolymer of diolefin containing more than 30 percent by weight of alkenyl aromatic hydrocarbon, the tensile strength in the unvulcanized state is considerably low. In the copolymer used in the present invention, a major part of diolefinic units is preferably combined by 1,4-addition. Such copolymers can be easily prepared by solution-polymerization, and the solution-polymerized copolymer is therefore more preferably used in the present invention. Examples of the catalysts for solution polymerization include the catalyst based on lithium metal or organolithium compounds, the catalyst obtained by the combination of transition metal compounds and organometallic compounds of Group 1, 2 or 3 of Periodic Table, and Alfin catalysts.

According to the present invention, an oil-extended rubber may be obtained from a copolymer having a Mooney viscosity above 100, but the solution viscosity of such copolymer is very high and the hydrogenation must be carried out in a low polymer concentration. In this case, the efficiency of the hydrogenation reaction is inferior and therefore the copolymer having a Mooney viscosity less than 100 is preferably used in the present invention. As is shown in the following examples, a highly oil-extended rubber with large tensile strength in the unvulcanized state can be obtained from a copolymer having a Mooney viscosity less than 60, which is one of merits of the present invention.

Examples of copolymers used in the present invention include styrene-butadiene random copolymer, styrene-isoprene random copolymer, α-methylstyrene-butadiene random copolymer, α-methylstyrene-isoprene random copolymer and the like. Such exemplification does not restrict the scope of a copolymer used in the present invention. Among them, styrene-butadiene random copolymer is preferably used and solution-polymerized styrene-butadiene random copolymer is more preferably used.

According to the present invention, after hydrogenating a random copolymer of diolefin and alkenyl aromatic hydrocarbon, process oil is mixed with the resulting hydrogenated copolymer. As the hydrogenation catalyst, use may be preferably made of the catalyst which can proceed the hydrogenation at a low temperature of below 100° C. and therefore does not cause side reactions such as degradation of a polymeric chain and gelation and furthermore can proceed the selective hydrogenation of diolefinic units. When the alkenyl aromatic units and the diolefinic units are hydrogenated non-selectively, the obtained polymer often becomes resin-like and is not suitable for manufacturing oil-extended rubbers.

Suitable process for preparing the hydrogenated random copolymer is the above mentioned process in which the hydrogenation catalyst formed from a nickel, cobalt, iron, chromium or manganese carboxylate and the organo-aluminum compound having the above described formula is utilized. In this process, other organic compounds of nickel, cobalt or iron may be used instead of the metal carboxylate for preparing the hydrogenated random copolymer to be used in the oil-extended rubber. As organic compounds, use may be preferably made of a metal chelate compound of which chelating agents are attached to the metal through a pair of two oxygen atoms and a metal chelate compound of which chelating agents are attached to the metal through a pair of an oxygen atom and a nitrogen atom. Examples of the chelating agents include acetylacetone, 8-hydroxyquinoline and the like.

According to the present invention, the random copolymer is hydrogenated selectively until the resulting hydrogenated copolymer has the percent unsaturation of less than 60. After hydrogenating until the resulting hydrogenated copolymer has the percent unsaturation of more than 60, an oil-extended rubber may be obtained by mixing process oil with the hydrogenated copolymer. In this case, an oil-extended rubber having good properties is obtained so far as the oil content is small, but when more than such amount (37.5 phr.) of process oil as used usually is mixed, the tensile strength in the unvulcanized state of the obtained oil-extended rubber decreases. The most desirable content of the hydrogenated diolefinic units in the hydrogenated copolymer is different depending upon the content of alkenyl aromatic hydrocarbon in the copolymer and the uses of the obtained oil-extended rubber. When the oil-extended rubber is vulcanized, at least about 1, preferably 5 percent by weight of non-hydrogenated diolefinic units must exist in the hydrogenated copolymer. When the hydrogenated copolymer having the percent unsaturation of less than 40 is used for producing an oil-extended rubber, the obtained oil-extended rubber containing even more than 100 phr. of oil has higher tensile strength in the unvulcanized state than an oil-extended rubber prepared by the prior art and can be vlucanized at desirable rate.

The process oil used in this specification means viscous liquid which is non-volatile at a room temperature and an atmospheric pressure. Any oil which can be mixed with rubbers may be used. Usually, so-called softeners and plasticizers are used in the present invention. The process oil which can be used in the present invention is classified by the following.

(1) Petroleum softeners

According to the classification by Kurtz, petroleum softeners can be classified by the following VGC (Viscosity-Gravity Constant).

$$VGC = \frac{G - 0.24 - 0.022 \log(V_1 - 35.5)}{0.755}$$

G: density of the softener at 60° F.
$V_1$: Saybolt Universal Viscosity at 210° F.

The petroleum softeners having VGC of from 0.79 to 1.0 and having viscosity at 210° F. of from 3 to 48 cstoke are preferably used in the present invention. When the petroleum softeners having different VGC and viscosity range from those described above is used, the oil-extended rubber compositions suitable for rubber articles are not obtained. Examples of the petroleum softeners include liquid paraffin and petroleum process oils such as paraffinic process oil, naphthenic process oil, aromatic process oil, asphalt process oil and the like.

(2) Coal tar softeners

Examples are coal tar and the like.

(3) Softeners from pine trees

Examples are pine-tar and the like.

(4) Tall oils

Examples are tall oil, refined tall oil and the like.

(5) Fatty oil softeners

Examples are cotton seed oil, rape seed oil, peanut oil and the like.

(6) Plasticizers

Examples of the plasticizers include phthalic acid derivatives such as dibutyl phthalate, dioctyl phthalate and the like, adipic acid derivatives such as dioctyl adipate and the like and diphenyl derivatives such as chlorinated diphenyl and the like.

(7) Miscellaneous

Examples are silicone oil, white mineral oil, low molecular weight polyolefins such as polybutene and the like.

Among above described process oils, petroleum softeners such as liquid paraffin, paraffinic process oil, naphthenic process oil and aromatic process oil are preferably used because of their low cost. Further, plasticizers are also preferably used because the oil-extended rubber obtained from them has the high tensile strength and desirable low-temperature properties.

The content of the process oil to be mixed with a hydrogenated copolymer may be varied widely. From 30 to 200 phr. of the process oil are mixed with the hydrogenated copolymer depending upon the uses of the obtained oil-extended rubber. When more than 200 phr. of process oil is mixed, the obtained oil extended rubber has insufficient tensile strength. According to the present invention, such a small amount as about 30 phr. of oil scarcely influences the physical properties of the vulcanized rubber, and the oil-extended rubber containing such a large amount as 100 phr. of oil has various excellent properties, especially very high tensile strength in the unvulcanized state, compared with the other oil-extended rubber prepared by the prior art. Therefore, the cost of rubber stocks can be decreased potentially according to the present invention.

Any usual known method may be used in mixing the process oil with the hydrogenated copolymer. A convenient method for preparing such oil-extended rubber is to mix the materials on a mill roll, in a Banbury mixer or a kneader. The temperature employed in the mixing operation may be varied widely depending upon the characteristics of the materials. If desired, rubber chemicals such as carbon black, an accelerator and sulphur may be compounded with the oil-extended rubber. Another convenient method is to mix the solution of the hydrogenated copolymers with the process oil, after which the oil-extended rubber is recovered by conventional methods such as by steam stripping. Further, when the content of alkenyl aromatic units and hydrogenated diolefinic units are combined suitably, powder of the hydrogenated copolymer can be easily obtained by mixing a large amount of acetone or methanol with the solution containing the hydrogenated copolymer. From such powder, an oil-extended rubber can be easily prepared by contacting the powder with oil and then heating the mixtures.

The oil-extended rubber produced by the present invention has various excellent properties compared with the oil-extended rubber produced by the usual method and is valuable industrially. For example, the oil-extended rubber containing about 100 phr. of oil has high tensile strength in the unvulcanized state which has never been obtained and can be vulcanized by conventional methods. The vulcanized oil-extended rubber has also various excellent properties such as high tensile strength, high resilience and excellent heat resistance. It is needless to say that the oil-extended rubber of the present invention has good roll processibility and good extrusion characteristics and therefore can be used by blending with natural rubber and synthetic rubbers such as styrene-butadiene copolymer, polybutadiene, polyisoprene and the like.

Percent unsaturation described in this specification was measured by Kemp-Wijs method (A. R. Kemp and H. Peters; Ind. Eng. Chem., Anal. Ed., 15, 453 (1943)) and degree of hydrogen saturation was calculated by measuring an amount of hydrogen absorbed. Assuming that percent unsaturation of polydiolefin is 100, the percent unsaturation and the degree of hydrogen saturation have the following relation.

Percent unsaturation = 100 − degree of hydrogen saturation

The invention is illustrated in the greater detail in the following examples which are not intended, however, to be unduly limitative of the invention.

EXAMPLE 1

In a mechanically stirred glass reactor of 2 litres capacity, 64 grams of styrene-butadiene random copolymer (styrene/butadiene:23/77) purified by benzene-acetone system, were dissolved in 1,000 grams of toluene which have been dehydrated by molecular sieve. Inside of the solution in the reactor, 3.2 grams of solution of nickel naphthenate in terpene containing 8% of nickel were reacted with 13 millilitres of toluene solution containing 2 moles of triethylaluminum per litre in the atmosphere of the hydrogen. Immediately, hydrogen was rapidly absorbed and the pressure in the reactor is reduced, so that hydrogen was introduced to maintain the pressure of hydrogen in the reactor 9.5 mm. Hg whereby hydrogenation was carried out. The solution was viscous and homogeneous. The catalyst was soluble in the solution and the color of solution was brown in first 5 minutes and then turned to black gradually. After 2 hours, the introduction of hydrogen was stopped and under stirring acetone containing hydrochloric acid was added to the solution to precipitate the polymer. 65 grams of strong, white rubbery polymer were obtained after drying under reduced pressure.

The infrared spectrum of this copolymer shows peaks at 721 cm.$^{-1}$ and 1,365 cm.$^{-1}$ assigned to $-(CH_2)_4-$ and $CH_3-$ of butadienic unit saturated with hydrogen, respectively, peaks at 967 cm.$^{-1}$ and 910 cm.$^{-1}$ assigned to trans-1,4-configuration and vinyl radical of butadienic unit respectively and peaks at 699 cm.$^{-1}$ and 757 cm.$^{-1}$ assigned to phenyl radical of styrenic unit, and no peaks in the range of from 820 to 900 cm.$^{-1}$ assigned to cyclohexyl radical.

Percent unsaturation was 28% and methyl cyclohexane which is obtained by the hydrogenation of toluene was not detected in the reaction medium by high sensitive gas chromatograph. These facts show that selective hydrogenation of olefinically unsaturated bonds was carried out.

EXAMPLE 2

Under the same condition as described in Example 1, hydrogenation was repeated and stopped after 8 hours. After 20 millilitres of acetone containing hydrochloric acid were added to the reactor, the reaction products were poured into a boiling water and then solvents were removed by azeotropic distillation. About 65 grams of strong, white rubbery polymers were obtained after drying. Percent unsaturation was 8.3%.

EXAMPLE 3

0.5 mmol of nickel naphthenate and 2 mmol of triethylaluminum were reacted in toluene at −78° C. in the atmosphere of dry nitrogen. The catalyst thus obtained was introduced into 100 millilitres of 5% solution of styrene-butadiene random copolymer in toluene and hydrogenation was carried out at 20° C. under an atmospheric pressure of hydrogen. The solution was homogeneous and the catalyst was soluble therein. After 165 minutes, the resulting polymer was precipitated with acetone containing diluted hydrochloric acid. The hydrogenated polymer thus obtained was rubbery and had a percent unsaturation of 38.5%.

EXAMPLE 4

In a mechanically stirred autoclave, an 8% solution of purified SBR #1502 (styrene/butadiene:23/77, ML–4 at 100° C.: 52) in toluene was hydrogenated in the presence of the catalyst prepared by reacting 8 mmol/lit. of nickel naphthenate with 24 mmol/lit. of triethylaluminum inside of said solution, at 25° C. under 10 kg./cm.$^2$ of hydrogen for 3 hours. The obtained copolymer had a percent unsaturation of 10.8%, which was pressed to a sheet of 3 mm. thickness at 100° C. This sheet is transparent and highly elastic, of which physical properties are shown in Table 2.

TABLE 2

| | |
|---|---|
| Hardness | 62 |
| Elongation at break (percent) | 640 |
| Tensile strength (kg./cm.$^2$) | 65 |
| Resilience at 25° C. (percent)* | 77 |

*Measured by Dunlop method.

The polymer compositions containing process oil (aromatic oil) were extruded through 2φ x 10 mm. die, and then the tensile strength and elongation at break were measured at the stretching speed of 20 cm./min. The tensile strength and elongation of the copolymer produced were extremely larger than the original SBR #1502 and natural rubber, even when the polymer was extruded with 100 phr. of process oil. Results are shown in Table 3.

As the process oil, use may be made of petroleum processing oils such as an aromatic, naphthenic, paraffinic process oil. Some other oils including a silicone oil, white mineral oil, low molecular weight polyolefins such as polybutene and chlorinated aromatics such as chlorinated bisphenyls may be used. These oil-extended polymer composition shows similar properties to those described above. Those oil-extended polymers may be used together with pigments such as carbon black, silica, Celite, clay and others.

TABLE 3

| | Tensile strength (kg./cm.$^2$) | Elongation (percent) |
|---|---|---|
| Hydrogenated SBR #1502 | 85 | 1,170 |
| Hydrogenated SBR #1502 containing— | | |
| 30 phr. oil | 73 | 2,010 |
| 50 phr. oil | 49 | 2,260 |
| 100 phr. oil | 28 | 2,980 |
| SBR #1502 | 3 | 300 |
| Natural rubber | 11 | 360 |

EXAMPLE 5

Hydrogenated SBR #1502 having a percent unsaturation of 16.2% was prepared in the same manner as shown in Example 4. The green strength of the obtained hydrogenated copolymer was about eight times of the original SBR #1502 even when 100 phr. of oil and carbon black were compounded and tensile strength after cured was almost the same, besides no decrease of tensile strength was observed after aged at 110° C. for 24 hours. The compounding recipe and other physical properties are summarized in Table 4.

TABLE 4

|  | SBR #1502 | Hydrogenated SBR #1502 |
|---|---|---|
| Percent unsaturation | 76.5 | 16.2 |
| Polymer | 100 | 100 |
| Carbon black ISAF | 50 | 100 |
| Zinc oxide | 5 | 5 |
| Stearic acid | 1 | 1 |
| Hitanol 1501 [1] | 5 | 5 |
| Antioxidant D | 1 | 1 |
| Aromatic oil | 10 | 100 |
| Nocceler MSA [2] | 1 | 1 |
| Sulphur | 2 | 2 |
| Green strength (kg./cm.$^2$) | 3 | 23 |
| *After cured at 150° C.×45 minutes* | | |
| Hardness | 59 | 53 |
| Elongation (percent) | 460 | 620 |
| 300% modulus (kg./cm.$^2$) | 117 | 68 |
| 500% modulus (kg./cm.$^2$) |  | 152 |
| Tensile strength (kg./cm.$^2$) | 210 | 202 |
| *After aged air heated at 110° C.×24 hours* | | |
| Elongation (percent) | 250 | 550 |
| 300% modulus (kg./cm.$^2$) |  | 99 |
| 500% modulus (kg./cm.$^2$) |  | 191 |
| Tensile strength (kg./cm.$^2$) | 180 | 201 |
| Tensile strength down (percent) | 14 | 0 |

[1] Commercial name of novolac-type alkyl phenolformaldehyde resin.
[2] Commercial name of N-oxydiethylene-2-benzothiazole sulfenamide.

EXAMPLE 6

Hydrogenated SBR #1502 having 15.5 percent unsaturation prepared in the same manner as shown in Example 4, original SBR #1502 and ethylenepropylene terpolymer (EPT) which was said to be a heat resistant polymer were compared by the use of EPT recipe.

The hydrogenated SBR #1502 had the largest green strength and the largest tensile strength after cured. After aged under the severe condition such as at 250° C. for 60 minutes, the hydrogenated SBR #1502 maintained the largest tensile strength and had the least decrease of tensile strength after aged.

The compounding recipe and other physical properties are summarized in Table 5.

TABLE 5

|  | SBR #1502 | EPT | Hydrogenated SBR #1502 |
|---|---|---|---|
| Percent unsaturation | 76.5 |  | 15.5 |
| Polymer | 100 | 100 | 100 |
| Carbon black HAF | 60 | 60 | 60 |
| Zinc oxide | 5 | 5 | 5 |
| Stearic acid | 1 | 1 | 1 |
| Hitanol 1501 | 6 | 6 | 6 |
| Nocrac NS-6 [1] | 1 | 1 | 1 |
| Nocceler TRA [2] | 2 | 2 | 2 |
| Nocceler TT [3] | 1 | 1 | 1 |
| Green strength (kg./cm.$^2$) | 3 | 17 | 139 |
| *After cured at 150° C.×60 minutes* | | | |
| Hardness | 67 | 56 | 72 |
| Elongation (percent) | 210 | 550 | 240 |
| 300% modulus (kg./cm.$^2$) |  | 110 |  |
| Tensile strength (kg./cm.$^2$) | 186 | 227 | 239 |
| *After aged air being temperature of 250° C.×60 minutes* | | | |
| Hardness | 72 | 68 | 72 |
| Elongation (percent) | 90 | 130 | 410 |
| 300% modulus (kg./cm.$^2$) |  |  | 99 |
| Tensile strength (kg./cm.$^2$) | 44 | 42 | 137 |
| Down of tensile strength (percent) | 76 | 81 | 43 |

[1] Commercial name of 2,2'-methylene bis(4-methyl-6-tert-butylphenol).
[2] Commercial name of bis(pentamethylene-thio-carbamoyl)tetrasulphide.
[3] Commercial name of tetramethylthiuramdisulphide.

EXAMPLE 7

In a mechanically stirred autoclave, a 10% solution of solution-polymerized styrene-butadiene random copolymer (styrene/butadiene 17/83) in hexane was hydrogenated in the presence of the catalyst prepared by reacting 6 mmol/lit. of nickel naphthenate with 18 mmol/lit. of triethylaluminum inside of said solution, at 30° C. under 9 kg./cm.$^2$ of hydrogen.

After 30 minutes, rubbery hydrogenated copolymer having a percent unsaturation of 24% was obtained, and after 90 minutes, strong thermoelastomer-like hydrogenated copolymer having a percent unsaturation of 4.9% was obtained.

EXAMPLE 8

Purified emulsion-polymerized styrene-butadiene random copolymers having different styrene contents were hydrogenated in the same manner as described in Example 1.

The polymers thus obtained had the properties as shown in Table 6.

TABLE 6.—COMPOUNDING RECIPE AND CURE CONDITION

| | |
|---|---|
| Polymer | 100 |
| Carbon black ISAF | 50 |
| Zinc oxide | 5 |
| Stearic acid | 1 |
| Hitanol 1501 | 5 |
| Nocrac D | 1 |
| Aromatic oil | 10 |
| Nocceler MSA | 1 |
| Sulphur | 2 |

*Cured at 150° C.×30 minutes*

|  | A | B | C |
|---|---|---|---|
| Styrene content (percent) | 8.6 | 41.4 | 57.3 |
| Percent unsaturation (percent) | 70.0 | 29.7 | 18.5 |
| Green strength (kg./cm.$^2$) | 6 | 12 | 36 |
| Hardness | 56 | 62 | 74 |
| Elongation (percent) | 460 | 510 | 470 |
| 300% modulus (kg./cm.$^2$) | 136 | 154 | 176 |
| Tensile strength (kg./cm.$^2$) | 247 | 287 | 251 |
| *After aged at 110° C.×24 hours* | | | |
| Hardness | 65 | 68 | 79 |
| Elongation (percent) | 260 | 310 | 230 |
| Tensile strength (kg./cm.$^2$) | 190 | 261 | 234 |

EXAMPLES 9 TO 16

In a shakable glass reactor of 300 milliliter capacity, the amounts specified in the following Table 7 of cis-1,4-polybutadiene (ML-4 at 100° C: 40) purified by toluene-methanol system were dissolved in 100 grams of dehydrated Decalin and the hydrogenation was carried out in the presence of the catalyst obtained by reacting nickel naphthenate containing 0.01 gram of nickel with triethylaluminum in this solution, in the mole ratio of Al to Ni being 4, and an amount of hydrogen absorbed was measured continuously by gas burette. As the hydrogenation proceeded, the color of solution was turned to from brown to black. After the reaction, acetone containing hydrochloric acid was added to the reactor and the polymer was obtained. Percent unsaturation and properties are shown in Table 7.

TABLE 7

| Example number: | Weight of polybutadiene (g.) | Reaction Temp. (°C.) | Reaction Time (min.) | Amount of hydrogen absorbed, °C., 1 atm. (ml.) | Percent unsaturation of hydrogenation | Polymer properties |
|---|---|---|---|---|---|---|
| 9 | 1.0 | 25 | 110 | 360 | 12.5 | Plastic. |
| 10 | 2.5 | 25 | 120 | 850 | 17.5 | Do. |
| 11 | 5.0 | 25 | 220 | 380 | 82.2 | Elastic. |
| 12 | 1.0 | 60 | 55 | 370 | 10.2 | Plastic. |
| 13 | 2.5 | 60 | 100 | 850 | 17.3 | Do. |
| 14 | 5.0 | 60 | 90 | 840 | 58.8 | Fiber. |
| 15 | 2.5 | 95 | 150 | 840 | 17.5 | Plastic. |
| 16 | 5.0 | 95 | 400 | 1,650 | 21.0 | Do. |

The infrared spectra of these copolymers show peak at 721 cm.$^{-1}$ assigned to —$(CH_2)_4$— of hydrogen-saturated butadienic unit and peaks at 967 cm.$^{-1}$, 911 cm.$^{-1}$ and 737 cm.$^{-1}$ assigned to trans-1,4-, vinyl- and cis-1,4- configurations respectively of butadienic unit.

EXAMPLES 17 TO 27

In the same reactor as used in Example 9, 3.2 mmol of nickel naphthenate were dissolved in a solution of 0.5 grams of cis-1,4-polybutadiene in 100 grams of Decalin, and to the resulting solution were added 0.5 to 17.9 mmol of triethylaluminum to react triethylaluminum with the nickel naphthenate, and then the solution was contacted at 27° C. with atmospheric pressure of hydrogen for 25 minutes. High hydrogenating activity was obtained in this experiment when mole ratio of Ni to Al was about 1:4. Even when mole ratio of Ni to Al was 1:0.2, hydrogenation was carried out to obtain rubbery hydrogenated polybutadiene. Experimental results are shown in Table 8.

TABLE 8

| Example number: | Triethyl aluminum (mmol) | Al/Ni mole ratio | Amount of hydrogen absorbed after— 5 min. (ml.) | Amount of hydrogen absorbed after— 25 min. (ml.) | Obtained hydrogenated polymer |
|---|---|---|---|---|---|
| 17 | 0.5 | 0.16 | | | |
| 18 | 0.6 | 0.20 | 2 | 3 | Elastic. |
| 19 | 0.8 | 0.25 | 8 | 15 | Do. |
| 20 | 1.3 | 0.4 | 50 | 132 | Plastic. |
| 21 | 2.6 | 0.8 | 185 | 190 | Do. |
| 22 | 5.1 | 1.6 | 202 | 206 | Do. |
| 23 | 7.7 | 2.4 | 232 | 240 | Do. |
| 24 | 10.2 | 3.2 | 238 | 250 | Do. |
| 25 | 12.8 | 4.0 | 248 | 260 | Do. |
| 26 | 17.9 | 5.6 | 130 | 180 | Do. |
| 27 | 25.6 | 8.0 | 92 | 122 | Do. |

EXAMPLE 28

In the same reactor as used in Example 9, 0.5 gram of cis-1,4-polybutadiene dissolved in 100 grams of Decalin were hydrogenated at 27° C. in the presence of the catalyst prepared by reacting 3.2 mmol of cobalt octanoate with 7.6 mmol of triethylaluminum.

Color of the solution turned to black and the catalyst was dissolved to the solution. 220 milliliters of hydrogen in first 5 minutes, and 250 milliliters of hydrogen after 60 minutes were absorbed. The resin-like hydrogenated polymers were obtained.

EXAMPLES 29 TO 34

In the same reactor as used in Example 4, 2.5 grams of cis-1,4-polybutadiene dissolved in 100 grams of Decalin were hydrogenated at 27° C. in the presence of the catalyst prepared by reacting 1 mmol of metal carboxylate and 5 mmol of triethylaluminum. After hydrogenation, rubbery polymers were obtained. Results are shown in Table 9.

TABLE 9

| Example number: | Metal carboxylate | Reaction time (min.) | Amount of hydrogen absorbed (ml.) | Percent unsaturation of obtained polymer |
|---|---|---|---|---|
| 29 | Nickel nonanate | 60 | 373 | 65 |
| 30 | Nickel p-t-butylbenzoate | 125 | 183 | 83 |
| 31 | Cobalt octanoate | 25 | 54 | 95 |
| 32 | Manganese octanoate | 25 | 14 | 98 |
| 33 | Iron octanoate | 90 | 127 | 88 |
| 34 | Chromium naphthenate | 122 | 124 | 89 |

EXAMPLES 35 TO 39

In the same reactor as used in Example 9, 0.25 gram of solution-polymerized polybutadiene (55% of trans-1,4-, 35% of cis-1,4- and 10% of 1,2-configuration), dissolved in various solvents were hydrogenated at 27° C. for 25 minutes in the presence of the catalyst prepared by reacting 1.6 mmol of nickel naphthenate and 4.7 mmol of triethylaluminum. Experimental results are shown in Table 10. The hydrogenated polymers thus obtained were plastic.

TABLE 10

| Example number: | Solvent | Amount of hydrogen absorbed (ml.) |
|---|---|---|
| 35 | Tetralin | 59.4 |
| 36 | Dioxane | 55.8 |
| 37 | Chlorobenzene | 80.6 |
| 38 | o-Dichlorobenzene | 75.1 |
| 39 | Xylene | 97.1 |

EXAMPLE 40

In the same reactor as used in Example 9, a solution of 0.5 gram of natural rubber purified by benzene-methanol system in 100 grams of Decalin was hydrogenated in atmospheric pressure of hydrogen at 27° C. in the presence of the catalyst prepared by reacting 3.2 mmol of nickel naphthenate and 7.7 mmol of triethylaluminum. 145 milliliters of hydrogen in first 25 minutes, and then 165 milliliters of hydrogen after 70 minutes were absorbed and rubbery hydrogenated polymers were obtained from reaction products.

EXAMPLE 41

In a high speed stirred 4 liter glass reactor connected to a gas burette, a solution of 100 grams of cis-1,4-polybutadiene in toluene was hydrogenated to the degree of hydrogen saturation of less than 10%, in the presence of the catalyst prepared by reacting nickel naphthenate containing 0.4 gram of nickel and 20 mmol of triethylaluminum. Degree of hydrogen saturation was controlled by measuring an amount of hydrogen absorbed through gas burette and by stopping the hydrogenation when predetermined amount of hydrogen was absorbed. The hydrogenated polymer containing various degrees of hydrogen saturation were compared with the original cis-1,4-polybutadiene. A similar experiment in the same controlled manner was made by using the catalyst prepared by reacting iron naphthenate, chromium naphthenate and manganese naphthenate with triethylaluminum. Green strength of the hydrogenated polymer thus obtained was extremely higher than that of the original polymer inspite of small degrees of hydrogen saturation. These hydrogenated polymers did not show cold flow. Compounding recipe and other physical properties are summarized in Table 11.

TABLE 11

| | Original polybutadiene | Hydrogenated polybutadiene | | |
|---|---|---|---|---|
| | | A | B | C |
| Degree of hydrogenation (percent) | 0 | 1 | 3 | 5 |
| Polymer | 100 | 1 | 3 | 5 |
| Carbon black ISAF | 50 | 1 | 3 | 5 |
| Zinc oxide | 3 | 1 | 3 | 5 |
| Stearic acid | 2 | 1 | 3 | 5 |
| Antioxidant D | 1 | 1 | 3 | 5 |
| Nocceler MSA | 0.8 | 1 | 3 | 5 |
| Sulphur | 1.8 | 1 | 3 | 5 |
| Aromatic oil | 10 | 1 | 3 | 5 |
| Hitanol 1501 | 3 | 1 | 3 | 5 |
| Green strength (kg./cm.$^2$) | 2 | 4 | 23 | 14.4 |
| After cured at 150° C.×30 minutes | | | | |
| Hardness | 54 | 54 | 60 | 60 |
| Elongation (percent) | 670 | 730 | 590 | 750 |
| 300% modulus (kg./cm.$^2$) | 63 | 57 | 78 | 50 |
| Tensile strength (kg./cm.$^2$) | 193 | 208 | 201 | 164 |

EXAMPLE 42

In Example 41, solution-polymerized polybutadene having 55% of trans-1,4-, 35% of cis-1,4- and 10% of 1,2-configuration and different organoaluminum compounds were used instead of cis-1,4-polybutadiene and triethylaluminum respectively. The organoaluminum compounds were diisobutylaluminum hydride, diethylaluminum ethoxide and isoprenylaluminum.

The hydrogenation was stopped at the degree of hydrogen saturation of 3%. The hydrogenated polymers obtained had higher green strength than the original polybutadiene and did not show cold flow.

EXAMPLE 43

150 mol of butadiene and 16.67 mol of isoprene were randomly copolymerized in hexane at 40° C. for 30 hours by a polymerization catalyst prepared from 22.2 mmol of nickel naphthenate, 166.5 mmol of borontrifluoride etherate and 190.3 mmol of triethylaluminum to prepare a solution of isoprene-butadiene random copolymer in hexane.

The yield of the resulting copolymer was 85% and said copolymer had an intrinsic viscosity of 3.04 measured at 30° C. in toluene. Infrared spectrum of the obtained copolymer showed that this copolymer consists of 12.5 mol percent of isoprenic units and 87.5 mol percent of butadienic units having 94.7% of cis-1,4-configuration. Then, to 200 grams of the copolymer solution thus obtained were added 2.8 mmol of nickel naphthenate and 19.6 mmol of triethylaluminum and then the resulting mixture was heated to 50° C. under a hydrogen pressure of 2 kg./cm.$^2$ for 1.5 hours to hydrogenate the copolymer. The color of the solution was brown initially and turned to black.

Hydrogenated isoprene-butadiene copolymer thus obtained was rubbery and had a percent unsaturation of 79%, and showed higher green strength and heat resistance than those of the original non-hydrogenated copolymer described above.

EXAMPLE 44

150 mol of butadiene were polymerized at 40° C. for 2.5 hours in toluene, in the presence of the polymerization catalyst prepared from 31.16 mmol of nickel naphthenate, 103.87 mmol of borontrifluoride etherate and 103.87 mmol of triethylaluminum, and then 150 mol of styrene and 30 mol of butadiene were added to the obtained polymer solution and further polymerization was continued at 130° C. for 5 hours.

The copolymer obtained was gel-free polybutadiene randomly grafted with styrene sequence and had an intrinsic viscosity of 2.74 at 30° C. in toluene. The structure of the copolymer was determined by analytical methods such as fractional solution, oxidative decomposition with osmium tetraoxide-tert-butylhydroperoxide, infrared spectrum and nuclear magnetic resonance.

Then to 156 grams of the copolymer solution thus obtained were added 1 mmol of nickel naphthenate and 7 mmol of triethylaluminum and then the resulting mixture was treated at 40° C. under a hydrogen pressure of 2 kg./cm.$^2$ for 2 hours to hydrogenate the copolymer. The hydrogenated copolymer had a percent unsaturation of 76%. A major part of the copolymer consisted of butadienic units having 87.8% of cis-1,4-, 7.2% of trans-1,4- and 5.0% of vinyl-configuration and hydrogen-saturated butadienic units. A minor part of the copolymer consisted of butadienic units grafted with styrene sequence and hydrogen-saturated butadienic units grafted with styrene sequence. The copolymer had 13.7% of styrene, which was determined by infrared spectrum. This hydrogenated copolymer has higher elasticity than the corresponding original copolymer before hydrogenation.

EXAMPLE 45

In a shakable glass reactor of 300 ml. capacity connected to a gas burette, 100 ml. of 2.8 wt. percent toluene solution of various polymers was placed. After the atmosphere of the reactor was displaced by hydrogen, 0.5 mmol of chromium naphthenate and then triethylaluminum were mixed with the polymer solution and the atmospheric pressure of hydrogen was contacted with the solution under shaking at 50° C. An amount of hydrogen absorbed was measured continuously by the gas burette. The color of the polymer solution was brown at first and then turned to black gradually. The solution was viscous but homogeneous, which shows the catalyst was soluble in the solution. After predetermined time, the introduction of hydrogen was stopped and acetone containing small amount of hydrochloric acid was added to the polymer solution under shaking. Next, the polymer solution was mixed with a large amount of acetone to precipitate the hydrogenated polymer. White, strong rubbery polymer was obtained after drying under the reduced pressure.

The infrared spectrum of the obtained hydrogenated polymers showed peaks at 721 cm.$^{-1}$ and 1,380 cm.$^{-1}$ assigned to —(CH$_2$)$_4$— and —CH$_3$ of butadienic units saturated with hydrogen respectively, peaks at 967 cm.$^{-1}$ and 910 cm.$^{-1}$ assigned to trans-1,4-configuration and vinyl radical of butadienic units respectively and peaks at 699 cm.$^{-1}$ and 757 cm.$^{-1}$ assigned to phenyl radical of styrenic units, and no peaks in the range of from 820 to 900 cm.$^{-1}$ assigned to cyclohexyl radical. Moreover, methylcyclohexane was not detected from the solution containing the hydrogenated polymer by high sensitive gas chromatograph. These facts show that the selective hydrogenation of olefinically unsaturated bonds of the polymer was carried out.

Degree of hydrogen saturation based upon 100% for the polymer of which butadienic units were completely hydrogenated are shown in the following Table 11.

TABLE 11

| | Al/Cr (molar ratio) | Reaction time (min.) | Degree of hydrogen saturation (percent) |
|---|---|---|---|
| Styrene-butadiene random copolymer (styrene/butadiene: 18/82) | 5.5 | 120 | 27.3 |
| Styrene-butadiene random copolymer (styrene/butadiene: 25/75) | 5.5 | 90 | 29.8 |
| Polybutadiene (cis-1,4- configuration: 35%, trans-1,4: 55%, 1,2:10%) | 5.0 | 90 | 17.7 |

EXAMPLE 46

In the same reactor as used in Example 45, 100 ml. of toluene solution of styrene-butadiene random copolymer (styrene/butadiene: 18/82) was placed. After the atmosphere of the reactor was displaced by hydrogen, the hydrogenation was carried out in the same manner as shown in Example 45 in the presence of the catalyst containing 0.5 mmol of chromium. The catalyst was prepared by reacting chromium carboxylate with triethylaluminum.

Results are shown in the following Table 12.

TABLE 12

| No. | Chromium carboxylate | Al/Cr (molar ratio) | Catalyst preparation | Polymer conc. (wt. percent) | Hydrogenation temp. (° C.) | Degree of hydrogen saturation (percent) |
|---|---|---|---|---|---|---|
| 1 | Chromium octanoate | 5 | In the polymer solution | 2.8 | 27 | 10.5 |
| 2 | do | 5 | do | 2.8 | 50 | 16.4 |
| 3 | Chromium stearate | 4 | In toluene at 50° C. for 10 min. in nitrogen. | 2.8 | 50 | 9.9 |
| 4 | do | 4 | do | 5.0 | 50 | 10.0 |
| 5 | Chromium benzoate | 5 | In the polymer solution | 2.7 | 50 | [1] 20.2 |
| 6 | do | 5 | do | 2.7 | 50 | 14.8 |

[1] Catalyst concentration was 1 mmol of chromium per 100 ml. of polymer solution to be hydrogenated.

EXAMPLE 47

6.2 kg. of emulsion-polymerized styrene-butadiene random copolymer (styrene/butadiene: 24/76, Mooney viscosity at 100° C.: 52), of which impurities had been removed from by methanol extraction, was dissolved in 100 l. of dehydrated toluene in mechanically stirred autoclave of 150 l. capacity. After the atmosphere of the reactor was displaced by hydrogen, 0.33 mol of nickel naphthenate and then 0.99 mol of triethylaluminum was mixed with the polymer solution. Hydrogen of 11 kg./cm.$^2$ was contacted with the polymer solution and the hydrogenation was carried out at 30° C. under stirring. The introduction of hydrogen was stopped after 90 minutes and the polymer solution was mixed with acetone containing a small amount of hydrochloric acid and then a large amount of acetone to precipitate the hydrogenated copolymer. After drying, the hydrogenated copolymer having the percent unsaturation of 35.7 was obtained. Then, an oil-extended rubber (A) was prepared by mixing the obtained hydrogenated copolymer with 37.5 phr. of aromatic oil on a mill roll.

In the same manner, 5.6 kg. of purified emulsion-polymerized styrene-butadiene random copolymer was dissolved in 110 l. of dehydrated toluene and the hydrogenation of the obtained polymer solution was carried out in the presence of the catalyst obtained by mixing 0.88 mol of nickel naphthenate with 2.64 mol of triethylaluminum. After 65 minutes, the hydrogenated copolymer having the percent unsaturation of 25.8 was obtained. Then, an oil-extended rubber (B) was prepared by mixing the same quantity of aromatic oil in the case of (A).

Oil-extended rubbers obtained by the above described method were compared with the commercially available oil-extended rubber SBR #1712 consisting of 37.5 phr. of aromatic oil and styrene-butadiene random copolymer of high molecular weight. The compounding recipe and physical properties of the compounded stock and vulcanized rubber are shown in the following Table 13.

TABLE 13

| Oil-extended rubber | (A) | (B) | SBR #1712 |
|---|---|---|---|
| Compounding recipe: | | | |
| Oil-extended rubber | 137.5 | 137.5 | 137.5 |
| Carbon black ISAF [1] | 68 | 68 | 68 |
| Sulphur | 1.5 | 1.5 | 1.5 |
| N-oxydiethylene-2-benzothiazol sulfenamide | 0.96 | 1.24 | |
| Dibenzothiazildisulfide | 0.24 | 0.26 | 0.85 |
| Diphenylguanidine | | | 0.5 |
| Compounded stock: | | | |
| Elongation (percent) | 625 | 850 | 215 |
| Tensile strength (kg./cm.$^2$) | 1.4 | 4.8 | 0.6 |
| Vulcanized rubber (145° C.×45 minutes): | | | |
| 300% modulus (kg./cm.$^2$) | 122 | 114 | 76 |
| Tensile strength (kg./cm.$^2$) | 269 | 275 | 252 |
| Resilience (percent) at— | | | |
| Room temperature | 44.6 | 44.9 | 36.5 |
| 120° C | 63.0 | 63.4 | 56.3 |

[1] Abbreviation of Intermediate Super Abrasion Furnace.

EXAMPLE 48

5.2 kg. of solution-polymerized styrene-butadiene random copolymer (SBR) (styrene/butadiene: 18/82, Mooney viscosity at 100° C.: 45) was dissolved in 110 l. of dehydrated toluene in the same autoclave as used in Example 47. In the same manner as described in Example 47, the hydrogenation was carried out at 37° C. in the presence of the catalyst obtained by mixing 0.66 mol of nickel naphthenate with 1.98 mol of triethylaluminum.

The hydrogenated copolymer having the percent unsaturation of 14.8 was obtained after 90 minutes. An oil-extended rubber was prepared by mixing the obtained hydrogenated copolymer with 50 phr. of aromatic oil on a mill roll.

The obtained oil-extended rubber or the original non-hydrogenated copolymer was pressed to sheet of 2 mm. thickness at 120° C. and elongation, 300% modulus and tensile strength of a test piece taken from the sheet were measured at the stretching speed of 50 cm./min.

Results are shown in the following Table 14.

TABLE 14

| | Hydrogenated SBR plus 50 phr. of aromatic oil | Original nonhydrogenated SBR |
|---|---|---|
| Elongation (percent) | 750 | 310 |
| 300% modulus (kg./cm.$^2$) | 34 | |
| Tensile strength (kg./cm.$^2$) | 204 | 3 |

EXAMPLE 49

6.7 kg. of solution-polymerized styrene-butadiene random copolymer used in Example 48 was dissolved in 110 l. of dehydrated toluene in the same autoclave as used in Example 47. After the atmosphere of the reactor was displaced by hydrogen, 0.48 mol of nickel naphthenate and then 1.30 mol of triethylaluminum was mixed with the polymer solution. Hydrogen of 5 kg./cm.$^2$ was contacted with the polymer solution and the hydrogenation was carried out at 40° C. The hydrogenated copolymer having the percent unsaturation of 3.1 was obtained after 14 hours. The obtained hydrogenated copolymer was mixed with liquid paraffin, dioctylphthalate or aromatic oil and then pressed to sheet of 2 mm. thickness at 120 C.

The results of the physical properties of a test piece taken from the sheet are shown in the following Table 15.

TABLE 15

| Oil | Liquid paraffin | Liquid paraffin | Dioctyl-phthalate | Aromatic oil |
|---|---|---|---|---|
| Content of oil (phr.) | 50 | 75 | 50 | 50 |
| Hardness (JIS) | 68 | 61 | 75 | 71 |
| Elongation (percent) | 720 | 780 | 730 | 670 |
| 300% modulus (kg./cm.$^2$) | 37 | 29 | 39 | 39 |
| Tensile strength (kg./cm.$^2$) | 204 | 211 | 250 | 278 |
| Resilience (percent) | | 60.3 | | |

EXAMPLE 50

6.7 kg. of solution-polymerized styrene-butadiene random copolymer (styrene/butadiene: 25/75, Mooney viscosity at 100° C.: 45) was dissolved in 110 l. of n-hexane and then hydrogenated at 70° C. under hydrogen of 5 kg./cm.$^2$ in the presence of the catalyst obtained by mixing nickel naphthenate with triethylaluminum. The catalyst concentration was 3 mmol of nickel per a litre of the polymer solution to be hydrogenated. The hydrogenated copolymer having the percent unsaturation of 5.8 was obtained after 5 hours. An oil-extended rubber was prepared by mixing the obtained hydrogenated copolymer with 200 phr. of aromatic oil and then compounded with the ingredients according to the following recipe.

TABLE 16

| | Phr. |
|---|---|
| Hydrogenated copolymer | 100 |
| Aromatic oil | 200 |
| Carbon black ISAF | 150 |
| Zinc oxide | 10 |
| Stearic acid | 3 |
| Benzothiazolyl disulfide | 1 |
| Bis(dimethyl thiocarbamoyl)disulfide | 0.5 |
| N-phenyl-2-naphthylamine | 1 |
| Sulphur | 3 |

Physical properties of the compounded stock and the vulcanized rubber are shown in the following Table 17.

TABLE 17

| | Compounded stock | Vulcanized rubber |
|---|---|---|
| 300% modulus (kg./cm.²) | 15 | 43 |
| Tensile strength (kg./cm.²) | 60 | 121 |
| Elongation (percent) | 710 | 975 |

[1] Vulcanized at 145° C. for 85 minutes.

These results show that the oil-extended rubber of the present invention maintains the considerably high tensile strength even when an extremely large amount of process oil is mixed.

What we claim is:

1. An oil-extended rubber composition comprising from 100 to 200 parts by weight of an aromatic oil and 100 parts by weight of hydrocarbon high copolymer consisting of butadiene units, hydrogen-saturated butadiene units and styrene units, said styrene units being from 1 to 30 percent by weight of total units and randomly distributed in said hydrocarbon high copolymer, a major part of said butadiene units and a major part of hydrogen-saturated butadiene units prior to hydrogen saturation being combined by 1,4-addition and said hydrocarbon high copolymer having a percent unsaturation of from 0 to 60 and having been solution-polymerized prior to hydrogen saturation, characterized by a tensile strength and elongation in the unvulcanized state measured at room temperature being at least about 5 kg./cm.² and at least about 300% respectively.

References Cited
UNITED STATES PATENTS

| 2,864,809 | 12/1958 | Jones et al. | 260—85.1 |
| 2,964,083 | 12/1960 | Pfau et al. | 260—31.8 R |
| 3,333,024 | 7/1967 | Haefele et al. | 260—880 B |
| 3,415,759 | 12/1968 | Johnson | 252—431 C |
| 3,595,942 | 7/1971 | Wald et al. | 260—880 B |

OTHER REFERENCES

Doolittle: Technology of Solvents and Plasticizers (Wiley), New York, pp. 952, 956, 957, 962 and 964.

Chemical Abstracts, vol. 64, 11422 and 11423 (1966), (abstract of Belgian Patent 651,281, dated Feb. 1, 1965).

Encyclopedia of Polymer Science and Techn., vol. 7, pp. 561 and 567 (Interscience) (New York) (1967).

ALLAN LIEBERMAN, Primary Examiner

H. H. FLETCHER, Assistant Examiner

U.S. Cl. X.R.

252—431 C; 260—31.8 DR, 85.1, 94.7 H